United States Patent Office 2,972,622
Patented Feb. 21, 1961

2,972,622
NEW DYESTUFFS OF THE ANTHRAQUINONE SERIES

Paul Grossmann, Binningen, Switzerland, assignor to Ciba Limited, Basel, Switzerland, a Swiss firm No Drawing. Filed Oct. 10, 1958, Ser. No. 766,422

Claims priority, application Switzerland Oct. 17, 1957

8 Claims. (Cl. 260—380)

The present invention concerns the manufacture of new 1-amino-2-aralkoxy-4-hydroxyanthraquinones of the general formula

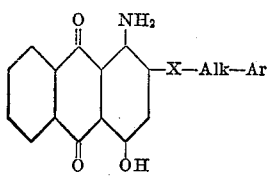

in which "alk" represents an alkylene group, especially a methylene group, Ar represents an aryl group, especially a benzene group and X represents an oxygen atom or a sulfur atom.

The new compounds are obtained by reacting a compound of the formula

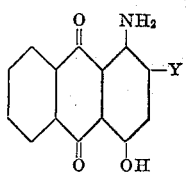

with a compound of the formula

Z-alk-Ar

"alk" representing an alkylene radical, and one of the substituents Z and Y a halogen atom or an aryloxy group, and the other a hydroxyl group or mercapto group in the formulae. For example a 1-amino-2-aryloxy-4-hydroxy-anthraquinone, preferably the 1-amino-2-phenoxy-4-hydroxyanthraquinone can be reacted with an arylalkyl alcohol, preferably a phenylalkyl alcohol. This is advantageously done in the presence of an alkali, especially an alkali hydroxide, with warming, for example, at a temperature between 100° C. and 150° C. A substantial excess of the aralkyl alcohol is added, for example, about ten times the theoretical quantity.

The 1-amino-2-aryloxy-4-hydroxyanthraquinones, especially the 1-amino-2-phenoxy-4-hydroxyanthraquinone, used as the starting material in the process, are advantageously prepared by the reaction of 1-amino-2-bromo-4-hydroxyanthraquinone with a phenol in the presence of an alkali, especially an alkali hydroxide.

Suitable arylalkyl alcohols which may be used are, for example, α-naphthyl-methyl alcohol, and especially a phenyl-alkyl alcohol, for example, a phenyl-ethyl alcohol especially benzyl alcohol and its substitution products, as, for example, α-methyl-benzyl alcohol, para-methyl benzyl alcohol, para-chloro-benzyl alcohol, para-methoxy-benzyl alcohol and meta-hydroxy-benzyl alcohol.

1-amino-2-bromo-4-hydroxyanthraquinone can also be used as starting material for the present process, particularly when the reaction is carried out with an aralkylmercaptan, for example benzyl-mercaptan. For the preparation of thio-ethers the reaction of 1-amino-2-mercapto-4-hydroxy-anthraquinone with an aralkylating agent may be specially mentioned. As suitable aralkylating agents there may be mentioned aralkyl halides, such as for instance benzyl chloride, sulfuric acid aralkyl esters, such as for example sulfuric acid benzyl ester. The alkylation is advantageously carried out in the presence of an alkali metal-, an alkaline-earth metal- or a magnesium compound acting as a base and also water, an alcohol or a water-soluble ketone. Under these conditions, only the hydroxy-group or mercapto group in the β-position is aralkylated. As compounds acting as bases there may be used, for example, magnesium oxide, but more especially an alkali carbonate or hydroxide. Examples of the ketones which may be used, are acetone, methyl ethyl ketone, diethyl ketone and cyclohexanone. The reaction is carried out at a raised temperature, especially at the boiling point temperature of the reaction mixture.

By the process of the invention there are obtained dyestuffs which are suitable for the coloring of hydrophobic textile materials, especially textiles of polyester fibers. The yellowish red to bluish red colorings produced therewith on polyester fibers, have very good properties of fastness, especially fastness to light and resistance to subliming, and as compared with known 1-amino-4-hydroxyanthraquinones, having an hydroxyalkoxy group in the 2-position, exhibit a markedly greater brilliance. Furthermore, the dyestuffs produced by this invention, as compared with comparable known compounds, have a considerably greater coloring power.

The following examples illustrate the invention, the parts and percentages being by weight, unless otherwise stated.

Example 1

9 parts of 1-amino-2-phenoxy-4-hydroxyanthroquinone are warmed in 90 parts of benzyl alcohol, together with 2 parts of caustic potash, at a temperature of 120° C. to 125° C., until no further 2-phenoxy compound is present, when examined under a microscope, and homogeneous crystals of 1-amino-2-benzyloxy-4-hydroxyanthraquinone have been formed. The dyestuff dissolves in organic solvents to give a yellowish red dye which gives to polyester fibers a bright yellowish red coloration of very good fastness.

If 90 parts of α-methyl-benzyl alcohol are used instead of benzyl alcohol, a dyestuff is produced which colors polyester fibers with a bright bluish red tone.

If p-methoxybenzyl alcohol is used, a dyestuff giving a somewhat bluer tone than with benzyl alcohol is produced.

If 90 parts of phenyl-ethyl alcohol are used, a dyestuff is produced which gives a bright bluish red coloration to polyester fibers.

When 90 parts of α-naphthyl-methyl alcohol are used instead of benzyl alcohol, a dyestuff is obtained which dyes polyester fibers somewhat more bluish shades.

Example 2

100 parts of 1-amino-2-bromo-4-hydroxyanthraquinone are heated with 130 parts of sodium sulfide of 60% strength and 50 parts of sulfur in 240 parts of water and 300 parts of ethyl alcohol for 5 hours at 90° C. in an autoclave fitted with stirring means. The volume of the solution is brought up to 2000 parts by volume with water, 400 parts of sodium chloride are added and the mixture is cooled to 0 to —5° C., filtered and washed with sodium chloride solution of 30% strength.

The resulting 1-amino-2-mercapto-4-hydroxy-anthraquinone is dissolved in 1000 parts of ethanol; benzyl chloride (approximately the theoretical quantity) is added at 75° C. until the blue violet color of the mercaptan disappears and the solution is nearly colorless because the benzyl thio-ether formed precipitates. The reaction product is filtered cold and washed with alcohol and water.

The reaction of the mercaptan and benzyl chloride can also be carried out in aqueous solution. Instead of converting 1-amino-2-bromo-4-hydroxyanthraquinone with sodium sulfide into 1-amino-2-mercapto-4-hydroxyanthraquinone and reacting the latter with benzyl chloride, 1-amino-2-bromo-4-hydroxyanthraquinone can be reacted directly with benzylmercaptan.

The resulting dyestuff after suitable dispersion dyes polyester fibers brilliant, blue red tints of good fastness properties.

*Example 3*

1 part of a watery paste of the dyestuff produced in Example 1 is milled in a roller-mill with approximately 1 part of dried sulfite cellulose waste liquor, to a fine dough having a dyestuff content of 10%.

100 parts of a "polyethylene-terephthalate"-fiber material are purified for a half-hour in a bath containing 1 to 2 parts of the sodium salt of N-benzyl-μ-heptadecyl-benzimidazole-disulfonic acid and 1 part of concentrated aqueous ammonia solution to 1000 parts of water. The fiber-material is then put into a dye bath containing a dispersion of the dyestuff dough as described in paragraph 1 with 4 parts of the sodium salt of N-benzyl-μ-heptadecyl-bezimidazole-disulfonic acid, in 3000 parts of water. The contents of the bath are then heated in a pressure vessel to a temperature of 120° C., and held at this temperature for about one half-hour. The material is then thoroughly rinsed, and advantageously washed, for one half-hour at a temperature of 60° C. to 80° C., with a solution of 1 part of the sodium salt of N-benzyl-μ-heptadecyl-benzimidazole-sulfonic acid in 1000 parts of water. A bright, yellowish red coloration of good fastness to light and sublimation is produced.

What is claimed is:

1. Anthraquinone dyestuffs of the formula

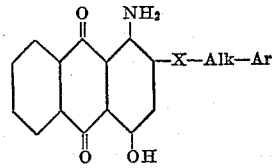

in which "alk" represents a lower alkylene group, X a member selected from the group consisting of an oxygen and a sulfur atom, and Ar a member selected from the group consisting of benzene and naphthalene radicals.

2. Anthraquinone dyestuffs of the formula

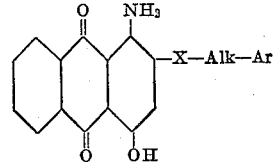

in which "alk" represents a lower alkylene group and Ar the benzene radical.

3. Anthraquinone dyestuffs of the formula

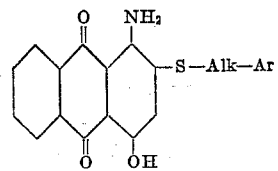

in which "alk" represents a lower alkylene group and Ar the benzene radical.

4. The anthraquinone dyestuff of the formula

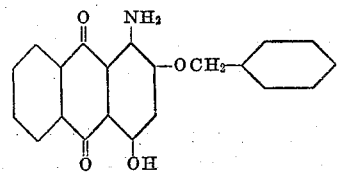

5. The anthraquinone dyestuff of the formula

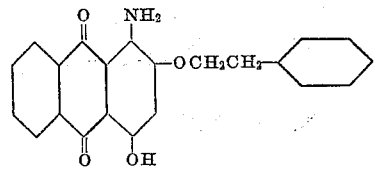

6. The anthraquinone dyestuff of the formula

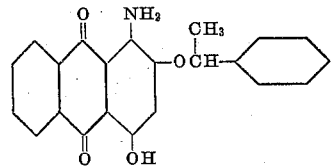

7. The anthraquinone dyestuff of the formula

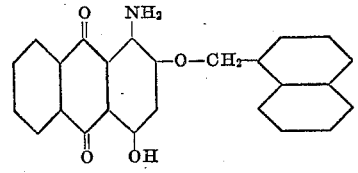

8. The anthraquinone dyestuff of the formula

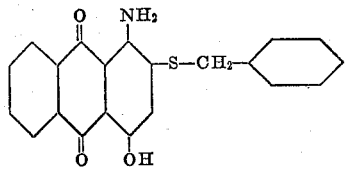

References Cited in the file of this patent

UNITED STATES PATENTS 2,773,071    Pizzarello et al.           Dec. 4, 1956

FOREIGN PATENTS 558,433    Great Britain             Jan. 5, 1944